United States Patent [19]
Kim

[11] Patent Number: 5,707,111
[45] Date of Patent: Jan. 13, 1998

[54] VEHICLE SEAT LOCKING SYSTEM

[76] Inventor: Chang Seo Kim, 11920 Centraliard, No. 4, Hawaiian Gardens, Calif. 90716

[21] Appl. No.: 651,820

[22] Filed: May 21, 1996

[51] Int. Cl.⁶ ........................................... B60N 2/22
[52] U.S. Cl. .................... 297/378.12; 297/378.14; 297/378.1; 70/261
[58] Field of Search ............... 297/378.12, 378.14, 297/378.1; 70/261, 209, 211, 212, 237

[56] References Cited

U.S. PATENT DOCUMENTS

| | | | |
|---|---|---|---|
| 4,394,048 | 7/1983 | Sakurai et al. | 297/378.12 X |
| 4,836,608 | 6/1989 | Sugiyama | 297/378.12 X |
| 5,028,086 | 7/1991 | Smith | 297/378.1 X |
| 5,412,964 | 5/1995 | Yee | 297/378.14 X |
| 5,415,458 | 5/1995 | Kim | 297/378.14 X |
| 5,433,507 | 7/1995 | Chang | 297/378.12 X |
| 5,522,643 | 6/1996 | Matsuura | 297/378.12 X |
| 5,547,254 | 8/1996 | Hoshihara | 297/378.12 X |
| 5,558,403 | 9/1996 | Hammoud et al. | 297/378.12 |
| 5,588,705 | 12/1996 | Chang | 297/378.12 X |

*Primary Examiner*—Peter M. Cuomo
*Assistant Examiner*—Rodney B. White
*Attorney, Agent, or Firm*—Eugene Oak

[57] ABSTRACT

The apparatus is a vehicle lock designed to prevent motor vehicle theft as well as protect costly items such as car stereos. The apparatus locks the driver's seat of a vehicle in a forward position, utilizing the existing components of a conventional seat back adjustment device while adding a minimal number of additional parts. Thieves are prevented from sitting in the driver's seat, thereby preventing the vehicle from being stolen.

2 Claims, 6 Drawing Sheets

VEHICLE SEAT LOCKING SYSTEM

BACKGROUND OF THE INVENTION

1. Field of the Invention

The present invention relates generally to a vehicle theft deterrent apparatus, particularly to a theft prevention device which utilizes the existing driver's seat of an automobile.

2. Description of the Prior Art

Numerous car theft deterrent apparatuses have been provided in prior art that are adapted to clamp onto steering wheels, brakes, gearshifts and similar parts, to prevent thefts. These apparatuses are bulky and must be installed and removed when being used. While these units may be suitable for the particular purpose to which they address, they would not be as suitable for the purposes of the present invention as heretofore described.

SUMMARY OF THE INVENTION

A primary object of the present invention is to provide a theft deterrent apparatus for a motor vehicle that will overcome the shortcomings of prior art.

Another object of the present invention is to protect expensive items commonly found in motor vehicles, such as car stereos, from being stolen.

Another object of the present invention is to provide a theft deterrent device which is used in conjunction with the existing driver's seat of a motor vehicle.

Another object of the present invention is to provide an alternative embodiment of the present invention which is used in conjunction with another seat of a motor vehicle.

Another object of the present invention is to provide a theft deterrent apparatus for a motor vehicle that is simple and easy to use.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

For a better understanding of the nature of the present invention, reference should be made to the following detailed description taken in connection with the accompanying drawings wherein.

DETAILED DESCRIPTION OF THE PREFERRED EMBODIMENT

Figure 1:
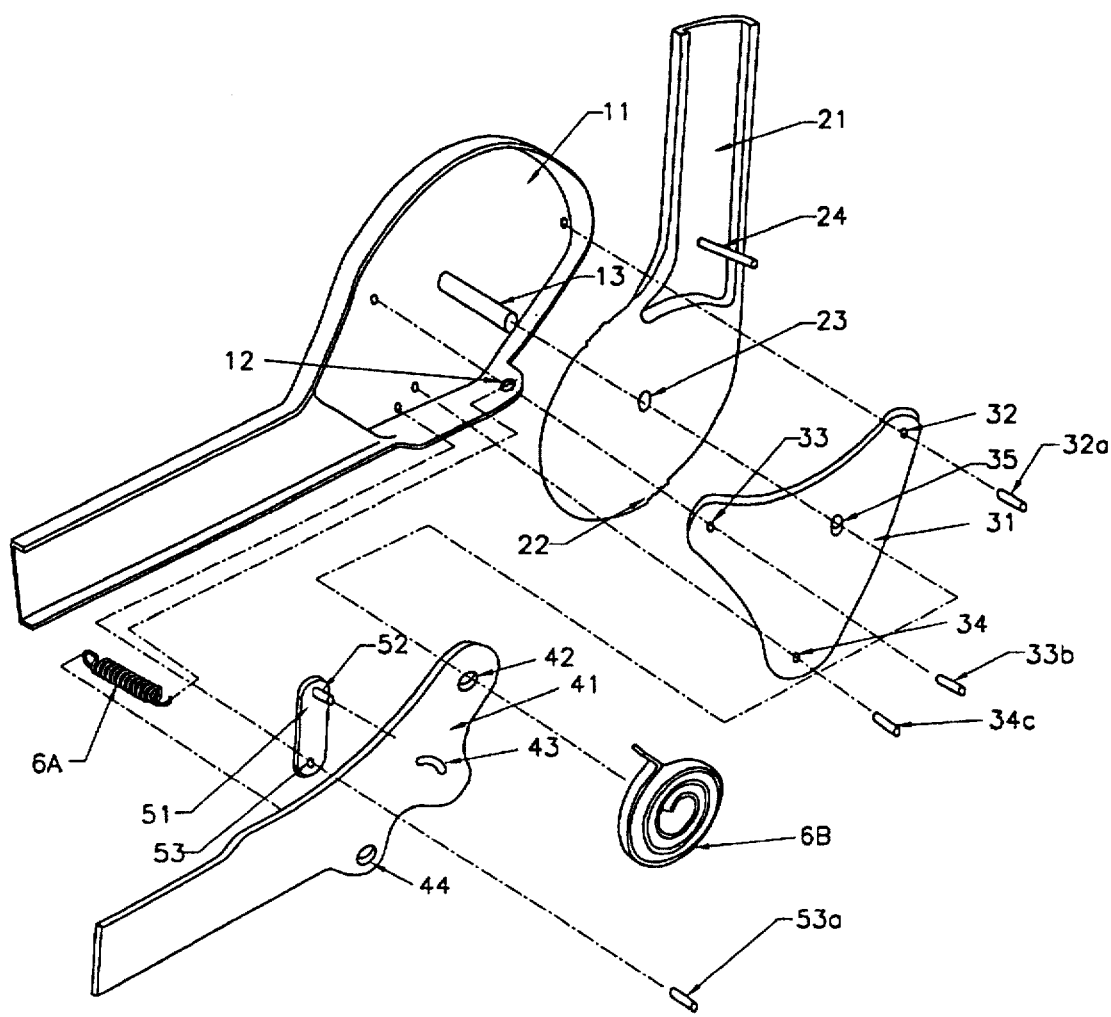
FIG. 1 is an exploded perspective view of a conventional seat back adjustment device.
Figure 2:
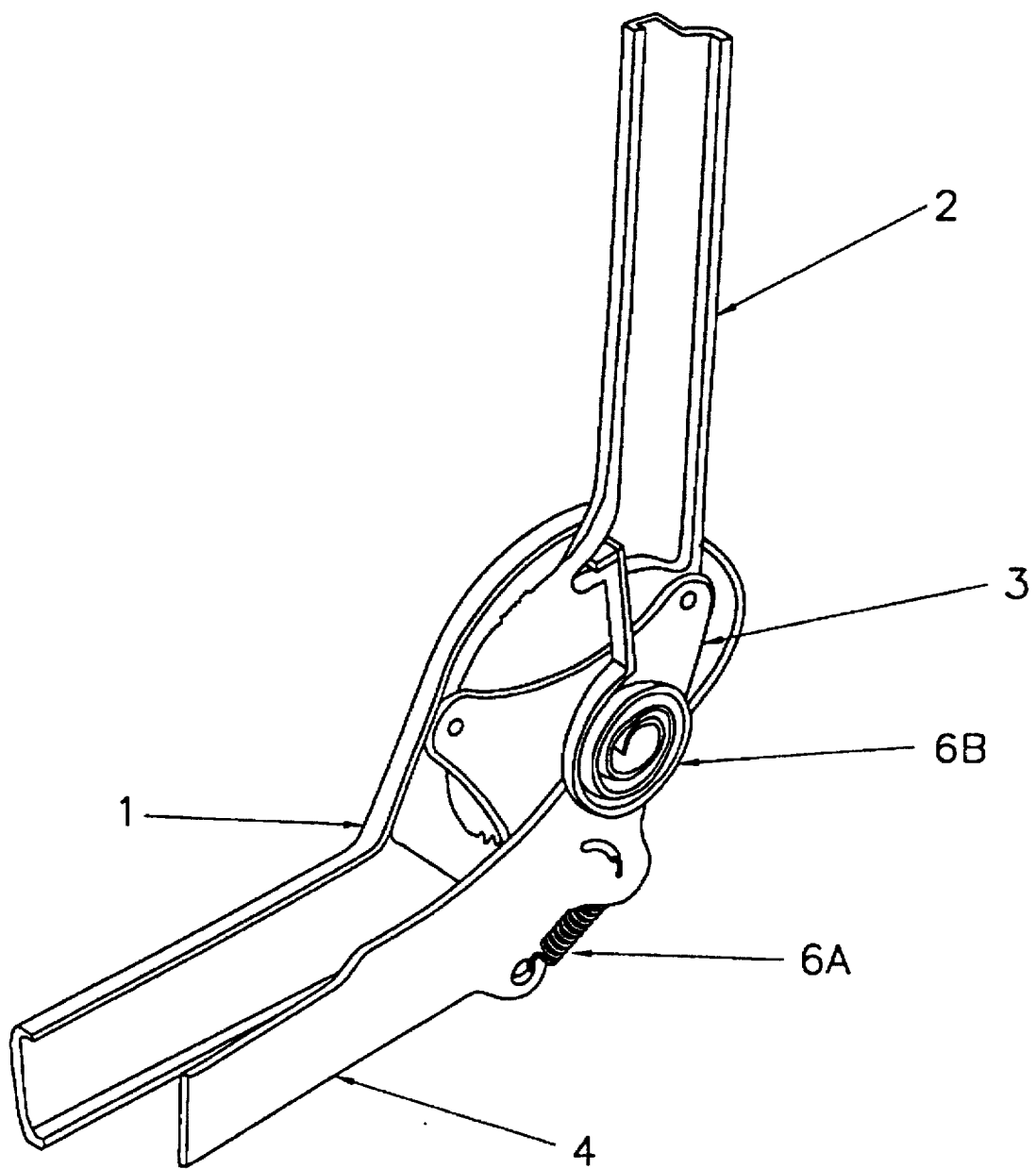
FIG. 2 is a perspective view of a conventional seat back adjustment device

Referring now to FIGS. 1 and 2, a conventional seat back adjustment device for a driver's seat of a motor vehicle comprises a seat frame 1 (and 11) having a small hole 12 therethrough, the central area of the seat frame 1 having an shaft 13 extending normally therefrom. A seat back frame 2 (and 21) has a round, circumferentially toothed lower end 22 thereof with a centrally positioned hole 23 therethrough corresponding to the shaft 13 of the seat frame 1. The body of the seat back frame 21 has a small protruding member 24 extending normally therefrom. A joint angle 3 (and 31) has three holes 32, 33, and 34 therethrough corresponding to three small pins 32a, 33b, and 34c, respectively, as well as an approximately centrally positioned hole 35 therethrough corresponding to the shaft 13 of the seat frame 1. As the hole 35 fits onto the shaft 13 and the pins 32a, 33b, and 34c fit through the small holes 32, 33, 34 and are attached to the seat frame 1, the joint angle 3, seat back frame 2, and seat frame 1 are joined. Finally, a handle 4 (and 41) also has a hole 42 corresponding to the shaft 13. The handle 4 additionally contains a guide hole 43 therethrough which corresponds to a fixed pin 52 normally protruding from a rod 5 (and 51). The fixed pin 52 corresponds to the circumferentially toothed lower end 22 of the seat back frame 2. The rod 5 is connected to the seat frame 1 by means of a small pin 53a which passes through a small hole 53 in the lower end of the rod 5 and is attached to the seat frame 1. The handle 4 also has a small hole 44. A spring 6A is attached at one end to the small hole 44 of the handle 4 and at the other end to the small hole 12 of the seat frame 1. A concentrically wound spring 6B is attached to the end of the shaft 13 after the seat back frame 2, joint angle 3, and handle 4 have been mounted onto the shaft 13. The outer end of the spring 6B is in contact with and constantly pressing against the small protruding member 24 of the seat back frame 2.

When the handle 4 is lifted upward, activating the spring 6A, the small pin 52 protruding from the rod 5 is moved by the guide hole 43 of the handle 4 which separates the fixed pin 52 from the circumferentially toothed lower end 22 of the seat back frame 2. The seat back frame 2 is thus allowed to move forward as the concentrically wound spring 6B pushes the small protruding member 24 of the seat back frame 2, rotating the seat back frame 2 around the axis of the shaft 13 as it moves toward the handle 4. When the handle 4 is released, deactivating the spring 6A, the fixed pin 52 locks into one of the crevices of the circumferentially toothed lower end 22 of the seat back frame 2, thus maintaining the new position of the seat back frame 2.

To move the seat back frame 2 away from the handle 4, the handle is lifted upward, again releasing the fixed pin 52 from the circumferentially toothed lower end 22 of the seat back frame 2. The seat back frame 2 is then manually pressed backward, against the natural direction of the concentrically wound spring, and the handle is released when the seat back frame 2 has reached a desired location.

Figure 3:
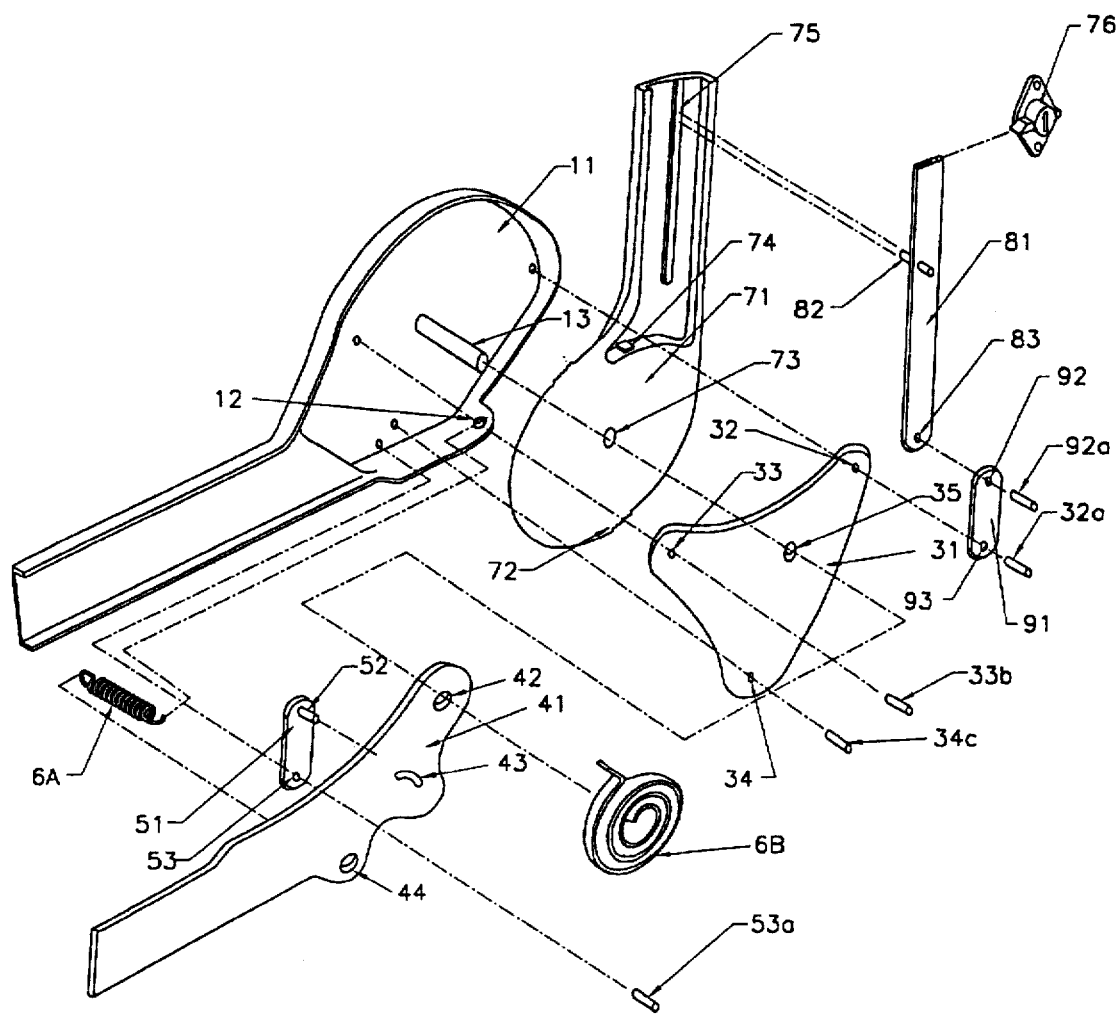
FIG. 3 is an exploded perspective view of the present invention.
Figure 4:
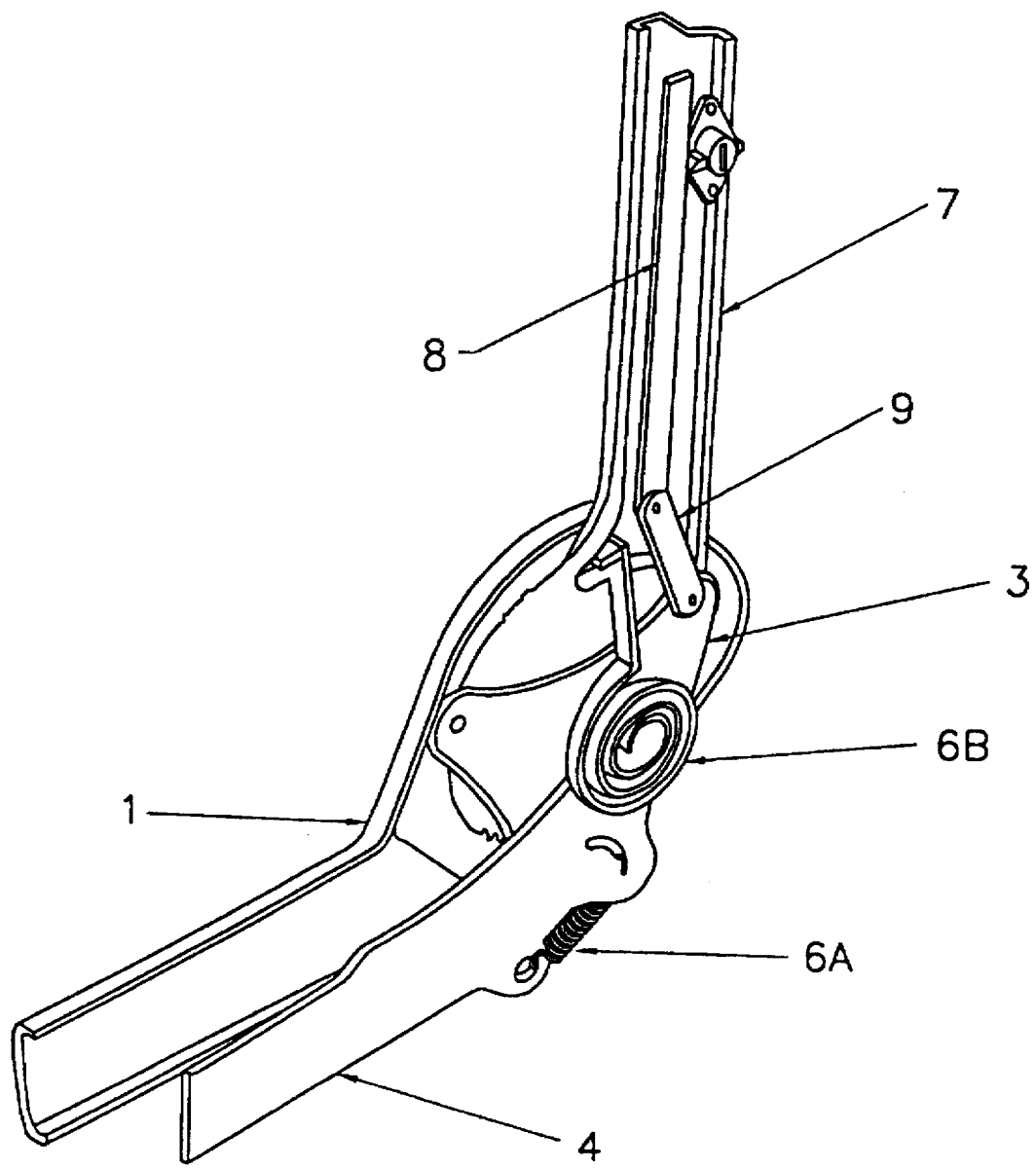
FIG. 4 is a perspective view of the present invention.

Referring now to FIGS. 3 and 4, the presently invented seat back locking device for the driver's seat of a motor vehicle functions in much the same way as the conventional seat back adjustment device described above. The present invention includes a seat back frame 7 (and 71) with a circumferentially toothed lower end 72 having a centrally positioned hole 73 mounted onto a shaft 13 of a seat frame 11. The present invention also utilizes a handle 41 having a guide hole 43 therethrough which moves a fixed pin 52 protruding from a rod 51, the fixed pin 52 fitting into the plurality of crevices of the circumferentially toothed lower end 72 of the seat back frame 71. The seat back frame 71 of the present invention is likewise constantly pressed forward by a concentrically wound spring 6B when a handle 41 is pulled upward.

The present invention, however, has the addition of a guide home 75 in the seat back frame 71. A small pin 82 protruding from a guide bar 8 (and 81) slides upward and downward along the guide home 75 of the seat back frame 71. A lock 76 for locking the guide bar 8 is attached to the seat back frame 71 adjacent to the guide home 75. A small hole 83 in the bottom of the guide bar 8 is connected to a small hole 92 in the top of a link 9 (and 91) by a small pin 92a. A small hole 93 in the bottom of the link 91 is connected to the small hole 32 of the joint angle 31 by the small pin 32a used in the conventional seat back adjustment device. The guide bar 8 and the joint angle 31 are thereby connected.

Figure 5A:
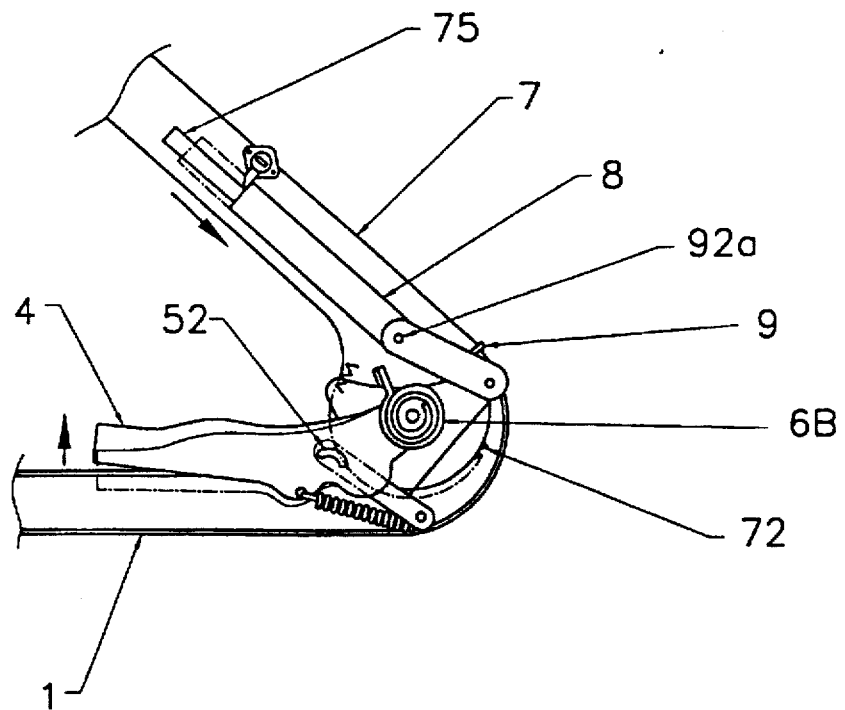
FIG. 5a is a sectional side view of the present invention in its locked position.

Referring now to FIG. 5a, when the handle 4 of the present invention is lifted upward, the fixed pin 52 of the rod 5 follows the guide hole 43 on the handle 4 and is separated from the circumferentially toothed lower end 22 of the seat back frame 7. The concentrically wound spring 6B then pushes the seat back frame forward, rotating the seat back frame around the axis of the shaft 13 and toward the handle 4. The guide bar 8 is simultaneously pulled downward (direction of arrow) by the link 9, following the guide home 75 of the seat back frame 7. The guide bar 8 is automatically locked just as its upper end passes the lock 76, which has a protruding member constantly pressing against the side of the guide bar 8.

Figure 5B:
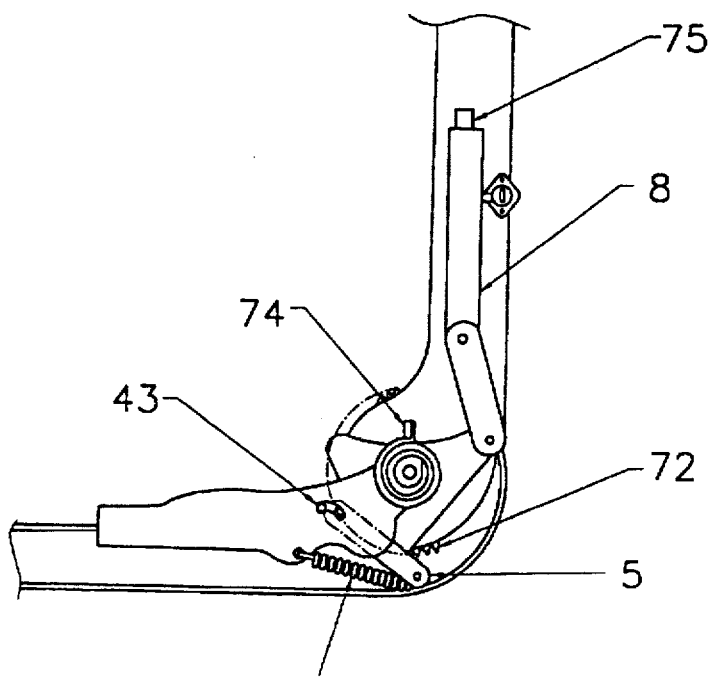
FIG. 5b is a sectional side view of the present invention in its unlocked position.

Referring now to FIG. 5b, the present invention is unlocked by a key. As the handle 4 is pulled upward, the fixed pin 52 of the rod 5 follows the guide hole 43 of the handle 4 and is separated from the circumferentially toothed lower end 22 of the seat back frame 22. The seat back frame 7 must then be pushed backward to allow space for the driver of the vehicle to sit down. As the handle 4 is released, it is pulled back to its original position by the spring 6A, thereby locking the fixed pin 52 back into one of the crevices of the seat back frame 7. The guide bar 8 is also relocated back to its original position, higher up along the guide home 75 of the seat back frame 7. As stated before, the presently invented seat back locking device is designed for the driver's seat of a motor vehicle to be used by the driver of a motor vehicle. An alternative embodiment of the present invention is provided which allows a passenger of a motor vehicle to operate the present invention.

Figure 6:
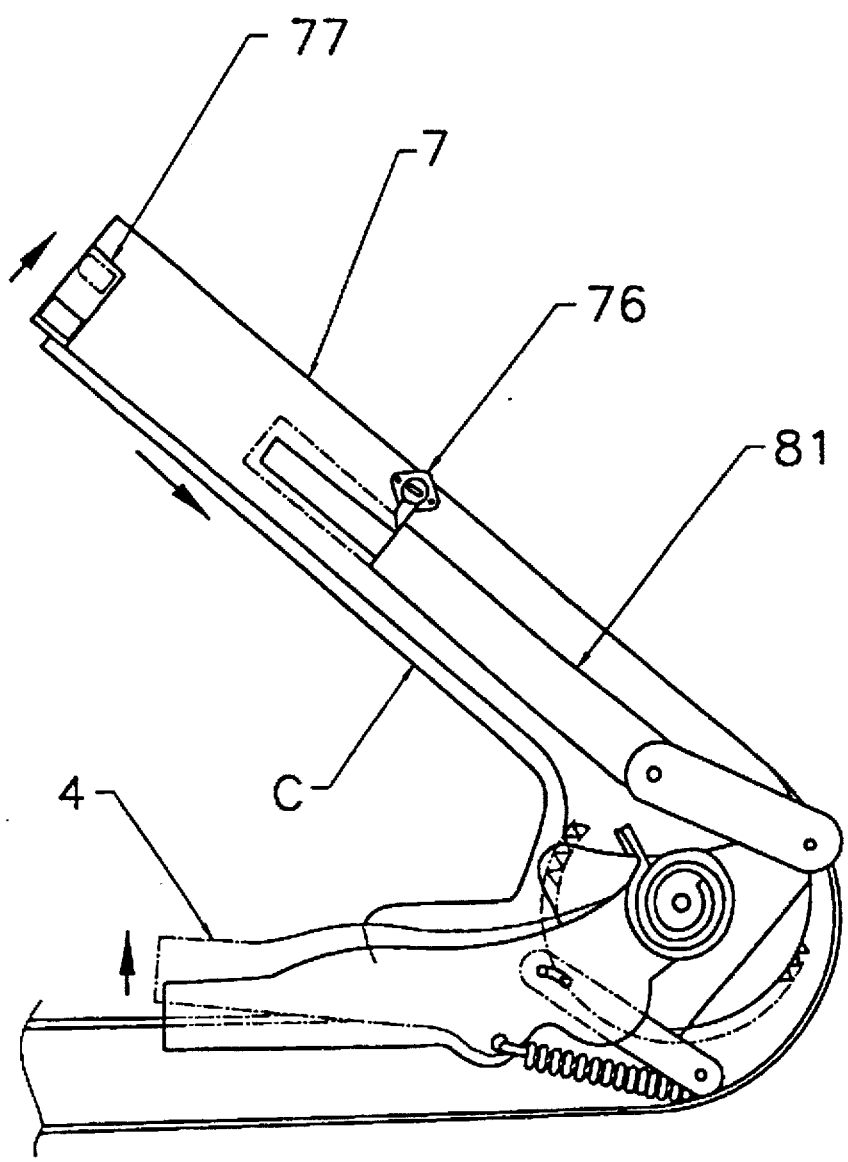
FIG. 6 is a sectional side view of an alternative embodiment of the present invention.

Referring now to FIG. 6, one end of a cable C is attached to a lock handle 77 located at the side of the top of the seat. The other end of the cable C is attached to the handle 4. As the lock handle 77 is moved in the direction of the arrow, the cable C pulls the handle 4 upward, thus enabling a person to operate the present invention.

I claim:

1. A vehicle seat back locking apparatus comprising:

a) a seat frame having a shaft extending normally therefrom and having small hole therethrough;

b) a seat back frame having a guide home therethrough, a small protruding member extending therefrom, and a circular, circumferentially toothed lower end mounted onto said shaft by means of a centrally positioned hole therethrough;

c) a joint angle having three small peripheral holes therethrough and being mounted onto said shaft by means of an approximately centrally positioned hole therethrough and being connected to said seat frame by means of three small pins corresponding to said peripheral holes;

d) a handle having a guide hole therethrough, a small hole therethrough, and being mounted onto said shaft by means of a peripherally positioned hole therethrough;

e) a spring being connected at one end to said small hole of said handle and at another end to said small hole of said seat frame;

f) a rod having an upper and lower end, said lower end being connected to said seat frame by means of a pin, said upper end having a fixed pin extending normally therefrom;

g) said fixed pin being permanently installed in said guide hole of said handle, said fixed pin corresponding to said circumferentially toothed lower end of said seat back frame;

h) a concentrically wound spring mounted onto said shaft and continually pressing against said protruding member extending from said seat back frame;

i) a link having an upper and lower end, said lower end having a hole therethrough and being connected by said hole to one of said peripheral holes of said joint angle by means of said pin corresponding to said peripheral hole;

j) a guide bar having a fixed pin extending normally therefrom, said fixed pin being permanently installed in said guide home of said seat back frame;

k) said guide bar having an upper and lower end, said lower end having a hole therethrough and being connected by said hole to a hole in said upper end of said link, thereby connecting said guide bar to said joint angle;

l) a lock attached to said seat back frame and adjacent to said guide home, said lock having a protruding member constantly pressing against one side of said guide bar.

2. A vehicle seat back locking apparatus according to claim 1 and further comprising a lock handle attached to an upper end of the seat back frame to which the vehicle seat back locking apparatus is installed, said lock handle being connected to said handle by means of a cable.

* * * * *